Patented Dec. 31, 1940

2,227,128

UNITED STATES PATENT OFFICE 2,227,128

CHEMICAL COMPOSITION

Carleton Ellis, Montclair, N. J., assignor to Standard Oil Development Company, a corporation of Delaware No Drawing. Application February 6, 1940,
Serial No. 317,546

10 Claims. (Cl. 106—40)

This invention relates to plasticizing agents for cellulose derivatives such as cellulose ethers and esters. It also involves the use of nitroformals, particularly those nitroformals prepared by the interaction of formaldehyde and a nitrohydroxy paraffin.

Many high-boiling esters are now used as plasticizers. Among the most common are the esters of phosphoric and phthalic acids. Frequently camphor is employed to impart flexibility to molded articles of nitrocellulose. Camphor cannot be used as a plasticizer in lacquer compositions because of its rapid volatility from thin films. Camphor as well as some of the esters are objectionable because of the odor they impart to the finished product. Castor and China-wood oils have limited uses because of their inability to dissolve the derivatives of cellulose and consequently sweat out of the plastic composition or lacquer film at elevated temperatures. The important properties of these frequently used plasticizers are their low volatility, solvent action on the plastic compound and stability to light. Occasionally, plasticizers cause the material being plasticized to become gelatinous and no solvent action is observed in this case, although the product may be clear and flexible.

One object of my invention is to provide a plasticizer that will produce flexible films when used in conjunction with cellulose derivatives. Another object is to provide a plasticizer having a low volatility and a low freezing point. A further object is the use of 1,1-di(nitroalkoxy)alkanes as plasticizers of cellulose derivatives. Further objects will be apparent from the descriptions and examples given herein.

To eliminate ambiguity, I define the following terms that will be used in this specification. A solvent may be a single compound or mixture of compounds. An aliphatic nitrohydroxy compound may have either one or two hydroxy groups and may be a mixture or single compound. By plasticize, I mean the ability of a compound or mixture of compounds to increase the flexibility and clearness of a film formed by a cellulose derivative lacquer or to have the same effects upon a molded piece, the major portion of which is a cellulose derivative. A cellulose derivative is any cellulose ester or ether, either organic or inorganic.

For my purpose the formals made by condensing nitrohydroxy paraffins with formaldehyde serve as plasticizers. Cyclic acetals and ethers have been used for this purpose. My compounds, as herein disclosed, are condensed molecules not having a cyclic structure.

Formals that are applicable to this invention may be made by reacting a nitroparaffin with an aliphatic aldehyde or its polymer. The product of this reaction is a nitrohydroxy paraffin containing one or two hydroxy groups depending upon the proportions of aldehyde and nitroparaffin condensed.

If a nitroparaffin and an aliphatic aldehyde are interacted in equivalent molecular weights, a monohydroxy compound or nitroalcohol is formed. When two moles of aldehyde are used with one of nitroparaffin, a nitroglycol is the end product. Nitroalcohols, made in this manner, have nitro and hydroxyl groups on adjacent carbon atoms. In the case of nitroglycols, each hydroxyl group is attached to a carbon atom adjacent to the carbon atom to which is attached the nitro group.

The general procedure is to suspend or dissolve one mole of nitroparaffin in an equal volume of water or other inert solvent such as ethyl acetate or alcohol. The suspension or solution is stirred vigorously and an alkali catalyst such as calcium hydroxide or potassium carbonate is added. With continued stirring, either one or two moles of an aliphatic aldehyde are added, and the reaction product will be a nitroalcohol or a nitroglycol, respectively. During addition of the aldehyde the reaction mixture becomes a single liquid phase. After interaction is complete, any insoluble solid matter is filtered from the solution. A water-immiscible low-boiling solvent may be used to extract the nitroalcohol or nitroglycol from solution, after which separation of the nitrohydroxy product and solvent is effected by evaporation of the latter under atmospheric or subatmospheric pressure. Gentle heating, if necessary, may be employed to facilitate removal of the solvent. In some cases the nitroalcohol or nitroglycol may be separated by crystallization from the mother liquor. In the latter case the residual water is removed from the product by a desiccant. If a low-boiling inert solvent is used in place of water (as the reaction medium) the product may be isolated by evaporating the solvent after the excess or undissolved catalyst has been removed by filtration. The product in this case can be purified by an extraction or crystallization process.

Formals are prepared by reacting a nitrohydroxy paraffin with formaldehyde or its polymer paraformaldehyde. Molecular proportions are used and the reaction carried out in an inert low-boiling solvent, e. g., ethyl ether. An acid catalyst such as dry hydrogen chloride may be employed. The reaction is allowed to proceed at room temperature for several days. The solvent is removed by evaporation under reduced pressure after which the product is washed with water to remove any acid or unreacted materials present. The residue is a formal of a nitrohydroxy paraffin and belongs to the class of compounds which may be designated as 1,1-di(nitroalkoxy)alkanes.

Formals made from nitrohydroxy compounds, according to this invention, have many physical and chemical properties making them advantageous as plasticizers of cellulose esters or ethers. To further clarify the nomenclature herein used, the terms aliphatic nitrohydroxy compound and nitrohydroxy paraffin are synonymous. The nitroformals are liquids at low temperatures and are not appreciably volatile at room temperature. Plastics made with these 1,1-di(nitroalkoxy)alkanes are stable at low temperatures.

The solubility of nitroformals in water is very low. As previously stated, one of the steps in purifying these compounds depends upon their insolubility in water. The unreacted components are dissolved and the nitroformal remains as the residue. When it is desirable to use these plasticizers in lacquers or other liquid compositions, their high solubility in ordinary organic solvents is an advantage.

The nitroformals are almost odorless, which is desirable when a plasticizer is used in articles such as dishes, bottle tops and similar molded pieces. Formals of aliphatic nitroalcohols are solvents for some cellulose derivatives and gelatinizes the cellulose compounds that are not dissolved. Many cellulose ethers and esters, e. g., methyl, ethyl or benzyl cellulose or nitrocellulose, cellulose acetate, propionate or butyrate, are soluble or gelatinized by the formals of nitrohydroxy paraffins.

Any suitable method may be used for employing these formals of nitrohydroxy paraffins as plasticizing agents. When they are used in lacquers they may be mixed with the cellulose derivative before solution of the derivative in the liquid vehicle or may be added at any point in the manufacture of the lacquer. Low-boiling solvents such as ethyl or butyl acetates may be mixed with the nitroformals and the mixed solvent employed as a vehicle for lacquers.

Lacquers containing synthetic resins and cellulose derivatives give improved films when formals of nitrohydroxy paraffins are employed as plasticizers. The compositions having the plasticizer yield films which are very transparent and flexible. The latter property makes the film much less brittle and therefore less likely to crack than the unplasticized films.

Molding powders containing nitroformals as plasticizers can be made. The cellulose derivative, such as cellulose acetate, is intimately mixed with the plasticizing formal of a nitrohydroxy paraffin and the mixture molded at any desirable temperature and pressure. Temperatures as high as 175° to 200° C. may be used and the pressure employed varies depending upon the proportion of plasticizer and the pressing temperature. The ratio of plasticizer to cellulose derivative may vary within wide limits depending upon the relative flow necessary and the flexibility desired in the product. Clear-molded articles are easily obtained when nitroformals are used as plasticizers.

The molding powder may be formulated by an admixing of the nitroformal and cellulose ether or ester or by employing a low-boiling mutual solvent which is evaporated from the mixture of plastic and plasticizer and the resulting product powdered for molding by any suitable means.

As plasticizers, the formals of nitrohydroxy paraffins may be used in conjunction with other known plasticizers as well as alone.

Synthetic resins, natural resins, fillers, fire retardants, pigments and dyes may be used in compositions wherein the formals of nitrohydroxy paraffins are used as plasticizers to produce varied products.

The method of employing these materials as plasticizers is described in the examples contained herein. These examples will enable anyone skilled in the art to make and use formals of nitrohydroxy paraffins without further experimentation. I do not wish to limit my invention to the specific compounds used or to the amounts of these compounds or to the methods employed.

*Example 1.*—The formal of 2-nitropropanol was made according to the following method. One mole of nitroethane was mixed with an equal volume of water. Vigorous stirring of the water-nitroparaffin mixture was accompanied by the addition of 0.5 per cent of calcium hydroxide (based on the weight of nitroparaffin). One mole of formaldehyde in a water solution was slowly added to the agitated mixture. The reaction mass became a single phase liquid in about one-half an hour. Reaction was allowed to proceed for 5 hours longer. The nitroalcohol from the combination of the aldehyde and nitroparaffin was extracted with ethyl ether. The ether was evaporated under reduced pressure and 2-nitropropanol obtained as a residue. Two moles of the nitroalcohol were reacted with one mole of formaldehyde as the polymer paraformaldehyde. Interaction was carried out with ethyl ether as the liquid medium. Dry hydrogen chloride was used as a catalyst, the gas being introduced by bubbling it through the solution of nitroalcohol and admixed paraform. The mixture was allowed to react overnight at room temperature and then more hydrogen chloride added. After standing for several more days at room temperature, the reaction mixture was washed with water to remove hydrogen chloride and unreacted material. Evaporation of the ether under reduced pressure yielded the formal as an almost colorless liquid. The formal is liquid at temperatures as low as −20° C.

*Example 2.*—A solution was made containing two parts nitrocellulose, one part formal of 2-nitropropanol, as prepared in Example 1, and ten parts of dioxan as a solvent. Films of this material were prepared by pouring the solution onto a glass plate and allowing the solvent to evaporate. Similar films were made from solutions that were identical except that no nitroformal was used as a plasticizer. The film containing the formal of 2-nitropropanol was clear and more flexible than the film containing no plasticizer. The film from the non-plasticized lacquer was slightly cloudy.

*Example 3.*—A mixed nitroalcohol and nitroglycol was made by reacting one mole of 1-nitropropane with about one and one-half moles of formaldehyde. This reaction and subsequent formation of the formal were carried out as described in Example 1, the only difference being the proportion of reactants and substitution of 1-nitropropane for nitroethane. The mixed formals were not separated but used as synthesized. The product was composed of a mixture of the formals of 2-nitrobutanol and 2-nitro-2-ethylpropanediol-1,3.

*Example 4.*—A twenty percent solution of nitrocellulose in dioxan was made. Ten per cent (based on weight of nitrocellulose) of the formals from Example 3 was added to the nitrocellulose solution. Films were made by pouring the plasticized solution onto a glass plate and allowing the solvent to evaporate. Films formed by this method were clear and flexible. Corresponding films made from a solution of nitrocellulose in dioxan without a plasticizer were brittle and cloudy.

*Example 5.*—To a twenty per cent solution of cellulose acetate in dioxan, ten percent (based on weight of cellulose acetate) of the formal from Example 1 was added. Films were prepared by pouring some of the solution onto a horizontal glass plate and allowing the solvent to vaporize spontaneously. The films were clear and flexible. Similar films not containing the nitroformal plasticizer were cloudy.

*Example 6.*—Lacquers were made according to the following formula:

|  | Parts |
|---|---|
| Cellulose nitrate | 6.3 |
| Formal of 2-nitrobutanol | 1.0 |
| Resin | 0.4 |
| Solvent | 26.0 |

The formal of 2-nitrobutanol was made in the same manner as described in Example 1. The only difference in the procedure was the use of 1-nitropropane instead of nitroethane in forming the nitroalcohol.

A phthalic anhydride-glycerol type resin was employed as the resin. The resin was soluble in dioxan.

The resin and plasticizer were dissolved in the solvent, which was either dioxan, ethyl acetate or secbutyl acetate. In each instance some of the lacquer was poured onto a glass plate, the solvent permitted to evaporate spontaneously, and the resulting film compared with a similarly prepared film from a lacquer containing no plasticizer. The films containing plasticizer were physically superior in that they were clear and more flexible than the films not compounded with a nitro derivative of a formal. The unplasticized lacquer produced cloudy films.

*Example 7.*—(a) A lacquer was made having the following composition:

|  | Parts |
|---|---|
| Cellulose acetate | 4 |
| Resin | 0.3 |
| Plasticizer | 0.2 |
| Dioxan | 40.0 |

The resin used in this group of examples was of the phthalic anhydride-glycerol type. The plasticizer in all cases of this example was the formal of 2-nitrobutanol-1.

The lacquer was compounded by dissolving the plasticizer and resin in the solvent and adding the resulting solution to the cellulose acetate.

(b) A lacquer was made having the following formula:

|  | Parts |
|---|---|
| Cellulose acetate | 4 |
| Resin | 0.3 |
| Plasticizer | 0.8 |
| Dioxan | 40.0 |

(c) Another lacquer was made as follows:

|  | Parts |
|---|---|
| Cellulose acetate | 4 |
| Resin | 0.3 |
| Plasticizer | 4 |
| Dioxan | 40.0 |

(d) The following lacquer was mixed as previously described:

|  | Parts |
|---|---|
| Cellulose acetate | 4 |
| Resin | 0.3 |
| Dioxan | 40.0 |

Films were made of the above four lacquers by allowing some of the lacquer to dry on a glass plate. The flexibility was directly proportional to the percentage of plasticizer. The films containing the plasticizer were clear, while the unplasticized film was cloudy.

*Example 8.*—Small quantities of methyl cellulose, ethyl cellulose, cellulose acetate and nitrocellulose were mixed separately with small amounts of the formal of 2-nitropropanol. The mixtures were allowed to stand several hours at room temperature. Ethyl cellulose, cellulose acetate and nitrocellulose were soluble in the formal. Methyl cellulose was swollen to a gelatinous mass. The latter action is typical of many known plasticizers.

*Example 9.*—A molding powder was made from 85 per cent cellulose acetate and 15 per cent of the formal of 2-nitrobutanol. The cellulose acetate and formal were dissolved together in acetone and the mixture dried until substantially free of acetone. The dried mixture was ground and molded into cups in a hydraulic press. A molding temperature of 135 to 150° C. and pressure of 3,000 lbs. per square inch were used. The pressure was exerted on the mold for five minutes, after which the die containing the molded cups was removed from the press and allowed to cool to 50° C. The cup was removed from the die and compared with similar samples made from cellulose acetate containing no plasticizer and from cellulose acetate admixed with 15 per cent butyl lactate.

In every case, within the limits of 5 to 25 percent formal, based on the weight of the cellulose compound, cups made from the cellulose acetate formal of 2-nitro-butanol mixture were superior in flexibility to the unplasticized cup or the one containing butyl lactate plasticizer. Also, the molded pieces containing the formal as a plasticizer were clear.

It is seen from the preceding disclosures that my invention provides a plasticizing agent suitable for use in compositions containing cellulose derivatives. It involves the use of formals of nitrohydroxy aliphatic compounds as plasticizers. Furthermore, my invention is applicable to lacquers compounded from cellulose derivatives, synthetic resins, formals of nitrohydroxy aliphatic compounds and a solvent. Compounds herein disclosed as plasticizers may be employed in molding powders, adhesives and in any other composition wherein a plasticer or softening agent is desirable.

The formals of nitro-aliphatic alcohols are particularly adaptable for my purpose. In certain cases mixtures of formals of nitro-aliphatic alcohols and nitro-aliphatic glycols, as well as of nitro-aliphatic alcohols, can be used as plasticizers in conjunction with either cellulose derivatives and a solvent or cellulose derivatives, synthetic resins and a solvent to produce compositions suitable as lacquers that are of superior quality. Films produced from lacquers containing the nitroformals as plasticizers are clear and flexible. Frequently the films made from lacquers not plasticized were cloudy and brittle.

The proportion of plasticizer to cellulose derivative may vary within wide limits. Desired results can be obtained with 5 per cent plasticizer in some cases and in other instances equal or greater weights of plasticizer than cellulose derivative are employed. I do not wish to be limited to these specific amounts as lesser or greater proportions of plasticizer to cellulose derivative may serve my purpose. Furthermore, my invention is not limited to lacquers, as the compounds disclosed as plasticizers may be employed in any composition where a plasticizer is desirable or necessary. Adhesives and molded products may contain these formals of nitrohydroxy paraffins as plasticizers.

The compounds disclosed in this specification, e. g., formals of nitrohydroxy aliphatic compounds, may be used as the sole plasticizing agents or in conjunction with other known plasticizers such as tributyl phosphate, diethyl tartrate, diethyl phthalate, etc. Of course, mixtures of formals of nitrohydroxy paraffins may be used as well as the individual compounds.

The formals of nitrohydroxy paraffins are compatible with a wide variety of organic solvents. Acetone, ethyl acetate, sec-butyl acetate, dioxan and many other solvents, either low- or high-boiling, may be used in compositions employing the nitroformals herein disclosed.

Formals of nitrohydroxy paraffins particularly useful in carrying out my invention can be made by condensing a nitroparaffin with an aliphatic aldehyde, the resulting nitrohydroxy aliphatic compound then reacted with paraform or formaldehyde in an inert liquid medium such as ethyl ether. The product of the latter reaction is a formal of a nitrohydroxy paraffin. The compounds thus formed contain at least one nitro and two oxy groups.

What I claim is:

1. A new composition of matter comprising a cellulosic compound chosen from the group consisting of cellulose esters and cellulose ethers, and a formal of a nitrohydroxy paraffin, said formal being derived from a nitrohydroxy paraffin having a hydroxy group and a nitro group attached to adjacent carbon atoms.

2. A new composition of matter comprising a cellulosic compound chosen from the group consisting of cellulose esters and cellulose ethers, and a formal of a nitrohydroxy paraffin, said nitrohydroxy paraffin having two hydroxy groups attached to carbon atoms that are adjacent to the carbon atom to which the nitro group is attached.

3. A composition of matter suitable for use as a lacquer comprising a cellulose compound selected from the group consisting of cellulose esters and cellulose ethers, and a formal of a nitrohydroxy paraffin, the proportion of said formal and said cellulose compound being such that the formal substantially plasticizes the cellulose compound.

4. A composition, according to claim 3, in which the formal of a nitrohydroxy paraffin is the formal of a nitroalcohol.

5. A composition, according to claim 3, in which the formal of a nitrohydroxy paraffin is the formal of a nitroglycol.

6. A composition, according to claim 3, in which the cellulose compound is cellulose acetate.

7. A composition of matter comprising a cellulose compound selected from the group consisting of cellulose esters and cellulose ethers, and a formal of a nitrohydroxy paraffin, the proportion of said formal being not less than about 5 per cent and not more than about 100 per cent, based on the weight of the cellulose compound.

8. A composition of matter suitable for use as a molding powder comprising a cellulose compound selected from the group consisting of cellulose esters and cellulose ethers, and a formal of a nitrohydroxy paraffin, the proportion of said formal to said cellulose compound being such that the formal substantially plasticizes the cellulose compound.

9. A composition, according to claim 8, in which the cellulose compound is cellulose acetate and the formal of a nitrohydroxy paraffin is a formal of a nitroalcohol.

10. A composition of matter suitable for use as a molding powder comprising a cellulose compound selected from the group consisting of cellulose esters and cellulose ethers, and a formal of a nitrohydroxy paraffin, the proportion of said formal being not less than about 5 per cent and not more than about 25 per cent of the weight of the cellulose compound.

CARLETON ELLIS.